US011511998B2

(12) United States Patent
Yuge

(10) Patent No.: US 11,511,998 B2
(45) Date of Patent: Nov. 29, 2022

(54) CONTINUOUS PRODUCTION METHOD OF FIBROUS CARBON NANOHORN AGGREGATE

(71) Applicant: NEC Corporation, Tokyo (JP)

(72) Inventor: Ryota Yuge, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 17/059,086

(22) PCT Filed: May 29, 2018

(86) PCT No.: PCT/JP2018/020524
§ 371 (c)(1),
(2) Date: Nov. 25, 2020

(87) PCT Pub. No.: WO2019/229841
PCT Pub. Date: Dec. 5, 2019

(65) Prior Publication Data
US 2021/0229999 A1 Jul. 29, 2021

(51) Int. Cl.
C01B 32/18 (2017.01)
B01J 19/12 (2006.01)

(52) U.S. Cl.
CPC ............. *C01B 32/18* (2017.08); *B01J 19/121* (2013.01); *C01B 2204/02* (2013.01); *C01B 2204/065* (2013.01); *C01B 2204/22* (2013.01); *C01P 2004/03* (2013.01); *C01P 2004/04* (2013.01)

(58) Field of Classification Search
CPC ............. C01B 32/18; C01B 2204/02; C01B 2204/065; C01B 2204/22; B01J 19/121; C01P 2004/03; C01P 2004/04
See application file for complete search history.

(56) References Cited

U.S. PATENT DOCUMENTS 10,793,439 B2 * 10/2020 Yuge ................... B82Y 30/00
10,971,734 B2 *  4/2021 Yuge ..................... C01B 32/18

FOREIGN PATENT DOCUMENTS

| JP | 2005-350275 A | 12/2005 |
| JP | 6179678 B2 | 8/2017 |
| WO | 2004/069743 A1 | 8/2004 |
| WO | 2004/096705 A1 | 11/2004 |
| WO | 2004/103902 A1 | 12/2004 |

(Continued)

OTHER PUBLICATIONS

Pan, Z. W., et al. "Very long carbon nanotubes." Nature 394.6694 (1998): 631-632.*

(Continued)

*Primary Examiner* — Richard M Rump
(74) *Attorney, Agent, or Firm* — Sughrue Mion, PLLC

(57) ABSTRACT

The present invention addresses the problem of providing a method for producing a fibrous carbon nanohorn aggregate with higher efficiency. According to one embodiment of the present invention, a method for producing a carbon nanohorn aggregate comprising a fibrous carbon nanohorn aggregate, is provided, which includes a step (a) of fixing the end of a rod-shaped carbon target to a fixing jig, and a step (b) of irradiating the rod-shaped carbon target with a laser light, and moving the irradiation position of the laser light in the longitudinal direction of the rod-shaped carbon target without rotating the rod-shaped carbon target.

6 Claims, 4 Drawing Sheets

(56) References Cited

FOREIGN PATENT DOCUMENTS

| WO | 2004/113225 A1 | 12/2004 |
|---|---|---|
| WO | 2005/019103 A1 | 3/2005 |
| WO | 2016/147909 A1 | 9/2016 |
| WO | 2017/159351 A1 | 9/2017 |

OTHER PUBLICATIONS

Cheng, Meng-Dawn, et al. "Formation studies and controlled production of carbon nanohorns using continuous in situ characterization techniques." Nanotechnology 18.18 (2007): 185604.*

Ryota Yuge, et al., "Structure and Electrical Properties of Fibrous Aggregates of Carbon Nanohorns", The 63rd JSAP Spring Meeting 2016 [preprints], ISBN 978-4-86348-555-6, 21a-S421-6, Mar. 3, 2016, p. 14-115.

Ryota Yuge, et al., "Preparation and Characterization of Newly Discovered Fibrous Aggregates of Single-Walled Carbon Nanohorns", Advanced Materials, May 25, 2016, pp. 7174-7177, vol. 28, No. 33.

Takeshi Azami, et al., "Large-Scale Production of Single-Wall Carbon Nanohorns with High Purity", J. Phys. Chem. C, 2008, pp. 1330-1334, vol. 112.

Ryota Yuge, et al., "Preparation and Characterization of Fibrous Aggregates of Single-Walled Carbon Nanohorns", Abstract of the 49th Fullerenes-Nanotubes-Graphene General Symposium, IP-22, Sep. 7, 2015, p. 65.

Ryota Yuge, et al., Characterization and Supercapacitor Properties of Fibrous Aggregates of Single-Walled Carbon Nanohorns, Abstract of the 50th Fullerenes-Nanotubes-Graphene General Symposium, 1P-43, Feb. 19, 2016, p. 83.

International Search Report for PCT/JP2018/020524 dated Jul. 10, 2018 (PCT/ISA/210).

International Search Report dated Apr. 7, 2020, issued by the International Searching Authority in application No. PCT/JP2020/002778.

* cited by examiner

CONTINUOUS PRODUCTION METHOD OF FIBROUS CARBON NANOHORN AGGREGATE

CROSS REFERENCE TO RELATED APPLICATIONS

This application is a National Stage of International Application No. PCT/W2018/020524 filed May 29, 2018.

TECHNICAL FIELD

The present invention relates to a method for producing a carbon nanohorn aggregate comprising a fibrous carbon nanohorn aggregate and a producing member used thereto.

BACKGROUND ART

Conventionally, carbon materials have been used as conductive materials, catalyst carriers, adsorbents, separating agents, inks, toners, and the like, and in recent years, with the advent of carbon nanotubes, carbon nanohorn aggregates and the like, materials having a nano-size dimension such as carbon nanotubes, their characteristics as a structure have attracted attention.

In recent years, unlike conventional spherical carbon nanohorn aggregates (referred to as CNHs), a fibrous carbon nanohorn aggregate (carbon nanobrushes CNB) having a structure in which carbon nanohorns are assembled radially and elongated in a fibrous shape was discovered (Patent Document 1). CNB has excellent high dispersibility and high adsorptivity, and further has high electric conductivity. Therefore, it is expected to be applied to an electric conductive material of a lithium ion battery, a high-capacity capacitor electrode, a polymer actuator electrode, a sensor electrode, a catalyst carrier, and the like.

CITATION LIST

Patent Literature

Patent Document 1: International Publication Number 2016/147909

SUMMARY OF INVENTION

Technical Problem

Patent Document 1 describes a method for producing CNB in which laser ablation is performed while rotating a target in a container in which a catalyst-containing carbon target is placed. Although CNB is produced together with CNHs, the ratio of CNB in the product was very low in the method of Patent Document 1. Further, according to the method of Patent Document 1, CNB could not be continuously produced due to the evaporation of the catalyst and the degradation of the carbon near the laser irradiated spot. The objective of this invention is providing the method of producing CNB more efficiently in view of the subject mentioned above.

Solution to Problem

According to one embodiment of the present invention, provided is a method for producing a carbon nanohorn aggregate comprising a fibrous carbon nanohorn aggregate, the method comprising:

a step (a) of fixing an end of a rod-shaped carbon target to a fixing jig, and a step (b) of irradiating the rod-shaped carbon target with a laser light, and moving a irradiation position of the laser light in a longitudinal direction of the rod-shaped carbon target without rotating the rod-shaped carbon target.

Advantageous Effects of Invention

According to one embodiment of the present invention, CNB can be manufactured more efficiently.

DESCRIPTION OF EMBODIMENTS

The CNB manufactured in this embodiment will be described below.

The CNB has a structure in which carbon nanohorn aggregates of a seed type, a bud type, a dahlia type, a petal dahlia type, a petal type (graphene sheet structure), etc. are one-dimensionally connected. That is, it has a structure in which single-layer carbon nanohorn are radially aggregated and extend in a fibrous shape. Therefore, one or more of these carbon nanohorn aggregates are contained in the fibrous structure. The seed type is a shape with few or no angular protrusions on the surface of the fibrous structure; the bud type is a shape with some angular protrusions on the surface of the fibrous structure; the dahlia type is a shape with many angular protrusions on the surface of the fibrous structure; and the petal type is a shape with petal-shaped protrusions on the surface of the fibrous structure (graphene sheet structure). The petal-dahlia type is an intermediate structure between the dahlia type and the petal type. The CNB is not limited to the above structure as long as the single-layer carbon nanohorn are aggregated in a fibrous shape.

The diameter of each single-layer carbon nanohorn produced is about 1 nm to 5 nm, and the length thereof is 30 nm to 100 nm. The CNB usually has a diameter of about 30 nm to 200 nm and a length of about 1 μm to 100 μm. On the other hand, CNHs usually have a diameter of about 30 nm to 200 nm and a substantially uniform size.

Further, carbon nanotubes may be contained inside the CNB. From this, it is considered that CNB is produced by the following production mechanism. That is, (1) the carbon target is rapidly heated by laser irradiation, whereby the carbon and the catalyst are vaporized from the carbon target all at once, and a plume is formed by high-density carbon evaporation. (2) At that time, the carbon collide with each other to form carbon droplets having a certain size. (3) In the process of diffusion of the carbon droplets, the carbon droplets gradually cool and the graphitization of carbon proceeds to form tubular carbon nanohorn. At this time, carbon nanotubes also grow from the catalyst dissolved in the carbon droplets. Then, (4) the carbon nanotubes are used as a template and the radial structures of the carbon nanohorn are connected one-dimensionally to form CNBs.

The CNB is described in detail in Patent Document 1. The entire disclosure of Patent Document 1 is incorporated herein by reference.

Next, a method for manufacturing a carbon nanohorn aggregate containing CNB according to this embodiment will be described.

(Production Member)

Figure 2:
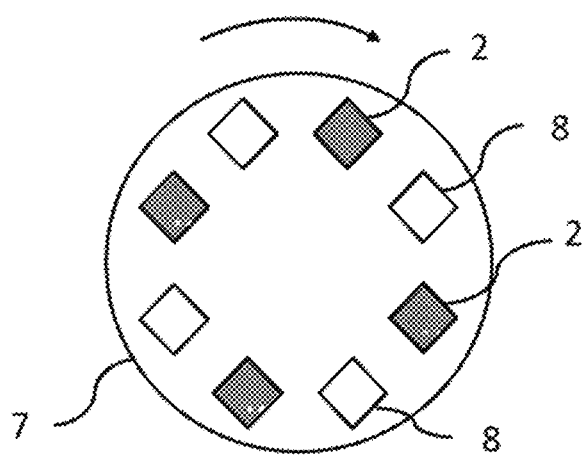
FIG. 2 is a front view of a manufacturing member according to the present embodiment equipped with a prismatic rod-shaped carbon target.
Figure 3:
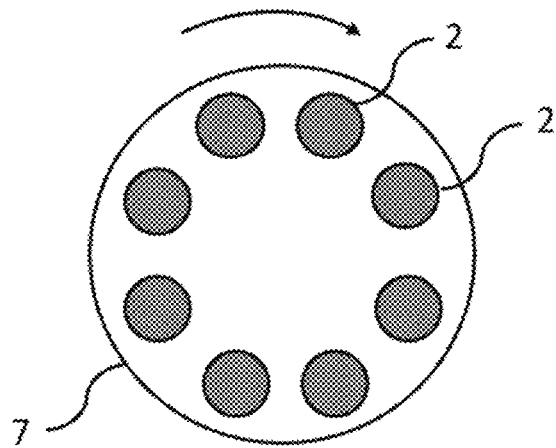
FIG. 3 is a front view of a manufacturing member according to the present embodiment equipped with a cylindrical rod-shaped carbon target.
Figure 4:
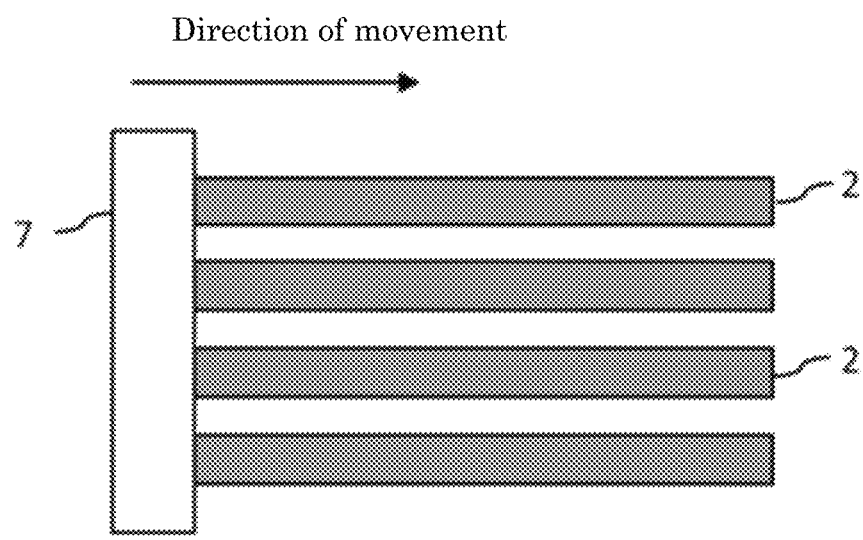
FIG. 4 is side view of the manufacturing member according to the present embodiment.

In the method for producing a carbon nanohorn aggregate including CNB according to the present embodiment, first, a production member for manufacturing a carbon nanohorn aggregate including CNB is provided. FIG. 2, FIG. 3, and FIG. 4 schematically show the production member. The production member includes a rod-shaped carbon target 2 and a fixing jig 7 that fixes the rod-shaped carbon target 2 at an end.

The rod-shaped carbon target 2 can be produced by uniformly mixing the fine particles of the catalytic metal and the carbon powder, and then forming into rod-shaped. The amount of CNB produced changes depending on the amount of catalyst contained in the rod-shaped carbon target 2. The amount of the catalyst can be appropriately selected, but the amount of the catalyst is preferably 0.3 to 20 atom % (at. %), 0.5 to 3 at. % is more preferable. When the amount of catalyst is 0.3 at. % less than %, the production of CNB is very small. Also, if the amount of catalyst exceeds 20 at. %, the cost will increase, which is not suitable. As the catalyst, Fe, Ni and Co can be used alone or in mixture. Among them, it is preferable to use Fe (iron), and it is particularly preferable to use the rod-shaped carbon target 2 containing Fe of 1 at. % or more and 3 at. % or less.

The physical properties (thermal conductivity, density, hardness, etc.) of the rod-shaped carbon target 2 affect the production of CNB. The rod-shaped carbon target 2 preferably has low thermal conductivity, low density, and is soft. The bulk density of the rod-shaped carbon target 2 is preferably 1.6 g/cm$^3$ or less, more preferably 1.4 g/cm$^3$ or less. The thermal conductivity of the rod-shaped carbon target 2 is preferably 15 W/(m·K) or less, more preferably 14 W/(m·K) or less. By setting the bulk density and the thermal conductivity within this range, the yield of CNB can be increased. If the bulk density and thermal conductivity exceed these ranges, the yield of CNHs and other carbon structures may increase and the yield of CNB may decrease.

The fixing jig 7 fixes the rod-shaped carbon target 2 at the end. At this time, the rod-shaped carbon target 2 may be fixed only at one end and may not be fixed at the other end. By fixing the rod-shaped carbon target 2 to the fixing jig 7 only at the end, most of the rod-shaped carbon target 2 can be exposed to the atmospheric gas. Thereby, the heat given from the laser light 5 can be prevented from being conducted from the rod-shaped carbon target 2 to other members, and the yield of CNB can be improved.

A plurality of rod-shaped carbon targets 2 may be fixed to the fixing jig 7. This makes it possible to easily manufacture a carbon nanohorn aggregate containing CNB from a plurality of rod-shaped carbon targets 2. Further, the fixing jig 7 can have the rod-shaped carbon target insertion port 8. In FIG. 2, an end portion of the rod-shaped carbon target 2 is inserted into portion of the rod-shaped carbon target insertion ports 8 and nothing is inserted into the other rod-shaped carbon target insertion ports 8. Then, the rod-shaped carbon target insertion port 8 is confirmed. The rod-shaped carbon target 2 can be more firmly fixed by inserting the end portion of the rod-shaped carbon target 2 into the rod-shaped carbon target insertion port 8. For example, the rod-shaped carbon target 2 can be firmly fixed by driving a screw from the outside of the rod-shaped carbon target insertion port 8. Moreover, the rod-shaped carbon target insertion port 8 may be cylindrical. For example, a nozzle may be provided as the rod-shaped carbon target insertion port 8 on the support table, and this may be used as the fixing jig 7. The rod-shaped carbon target 2 in FIG. 2 has a prismatic shape. The rod-shaped carbon target 2 in FIG. 3 has a cylindrical shape. As described above, the cross-sectional shape of the rod-shaped carbon target 2 is not particularly limited, and various shapes can be adopted. Generally, it is preferable to match the shape of the rod-shaped carbon target 2 with the shape of the rod-shaped carbon target insertion port 8.

In the present embodiment, the number of rod-shaped carbon targets 2 fixed to the fixing jig 7 is not particularly limited and may be one. The number of rod-shaped carbon targets 2 to be fixed to the fixing jig 7 may be appropriately set within a range of, for example, 1 to 30 or 1 to 10. When fixing a plurality of rod-shaped carbon targets 2, it is desirable to arrange the rod-shaped carbon targets 2 so that all the rod-shaped carbon targets 2 can be irradiated with the laser light 5. Further, preferably, the fixing jig 7 fixes the rod-shaped carbon targets 2 so that all the rod-shaped carbon targets 2 are substantially parallel in the longitudinal direction. The distance between adjacent rod-shaped carbon targets 2 is not particularly limited, but is preferably narrow from the viewpoint of arranging as many rod-shaped carbon targets 2 as possible in the fixing jig 7. However, it is also preferable to set a certain distance from the viewpoint of reducing the influence of heat from the adjacent rod-shaped carbon targets 2. For example, the distance between the adjacent rod-shaped carbon targets 2 can be set in the range of 1 to 10 mm.

The base material of the fixing jig 7 is preferably made of a material having a good heat dissipation property, for example, it can include metals selected from stainless steel, copper (Cu), aluminum (Al), tungsten (W), molybdenum (Mo), chromium (Cr), alloys containing these metals, ceramics, diamonds, or one selected from composites with said metals or alloys.

(CNB Manufacturing Device)

Figure 1:
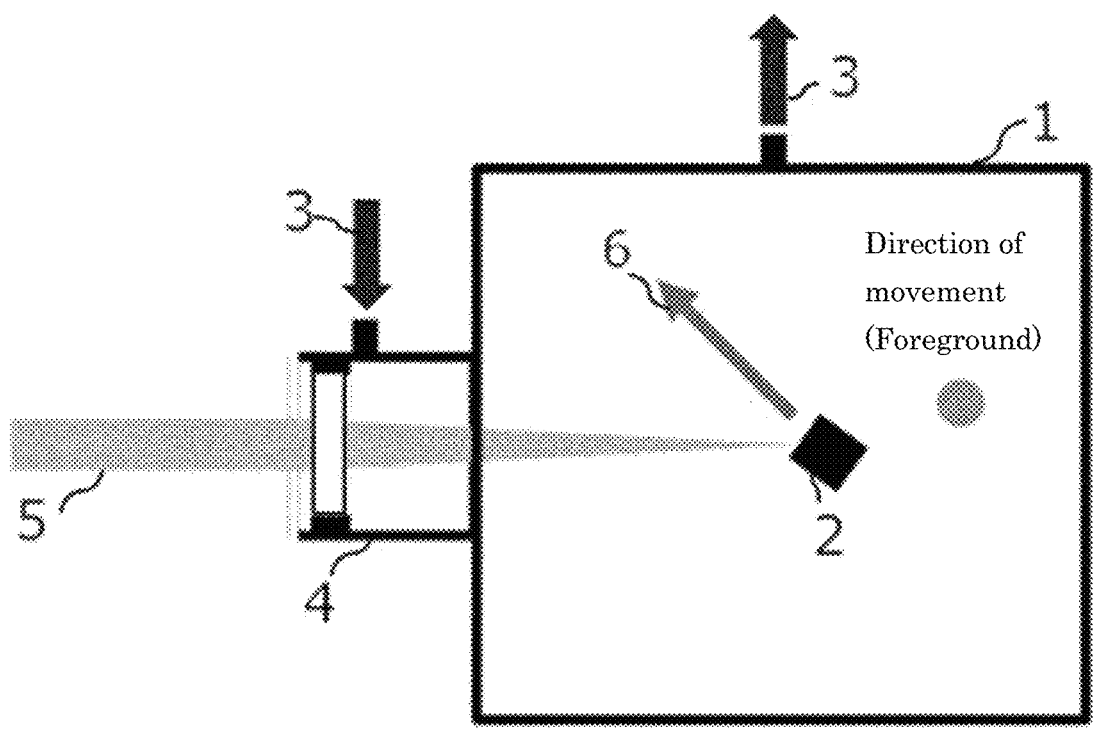
FIG. 1 is a schematic view showing a CNB manufacturing apparatus.

A fixing jig 7 for fixing the rod-shaped carbon target 2 is placed in a known CNB manufacturing device, by so doing, a carbon nanohorn aggregate containing CNB may be produced, but is not particularly limited. FIG. 1 is a diagram showing an outline of a general CNB manufacturing device. The device is a device for producing a product 6 containing CNB by irradiating the rod-shaped carbon target 2 with a laser light 5 in a non-oxidizing atmosphere such as nitrogen gas or an inert gas (Ar or the like) to evaporate carbon. The device comprises a production chamber 1 for producing CNB. Further, the production chamber 1 has a laser irradiation window 4 (for example, a window made of ZnSe) for irradiating the rod-shaped carbon target 2 in the production chamber 1 with a laser light 5 from a laser oscillator (for example, a carbon dioxide gas laser oscillator). Further, a gas insertion port/exhaust port 3 is connected to the production chamber 1 to introduce a non-oxidizing gas (rare gas such as nitrogen gas or Ar gas) is introduced into the production chamber 1. Here, gas is introduced from the gas insertion port 3 connected to the space provided with the laser irradiation window 4, and a flow is formed toward the rod-shaped carbon target 2 together with the laser light 5. In addition, the product 6 is recovered from the production chamber 1 through the gas exhaust port 3 to the recovery chamber (not shown) along with the flow of gas. Although not shown in FIG. 1, the rod-shaped carbon target 2 is fixed to the fixing jig 7 at the end. In FIG. 1, the rod-shaped carbon target 2 is arranged so that its longitudinal direction is horizontal, but the direction of the rod-shaped carbon target 2 arranged in the CNB manufacturing devise in this embodiment is not particularly limited.

Generally, the pressure in the production chamber 1 can be used 3332.2 hPa (10000 Torr) or less, but as the pressure becomes closer to vacuum, carbon nanotubes are easily produced, and CNB cannot be obtained. It is preferably to use it at 666.61 hPa (500 Torr) to 1266.56 hPa (950 Torr), and more preferably used near normal pressure (1013 hPa (1 atm≈760 Torr)) for mass synthesis and cost reduction. The temperature inside the production chamber 1 can be set to any temperature, but the temperature is preferably 0 to 100° C., more preferably room temperature, for mass synthesis and cost reduction. The above atmosphere is created by introducing nitrogen gas, rare gas, or the like into the production chamber 1 either aone or a mixture. These gases flow from the production chamber 1 to the recovery chamber, and the product 6 can be recovered by the gas flow. Alternatively, the closed atmosphere filled with the gas introduced in the production chamber 1 may be used. The gas flow rate may be any amount, but a range of 0.5 L/min to 100 L/min is appropriate. In the process of carbon evaporation, the gas flow rate is preferably controlled to be constant. The gas flow rate can be made constant by combining the supply gas flow rate and the exhaust gas flow rate. When the pressure in the production chamber 1 is near normal pressure, the gas in the production chamber 1 may be extruded and exhausted by the supply gas. Moreover, the pressure can be made constant by controlling the rotary pump and the dry pump.

(Laser Light Irradiation)

Figure 5:
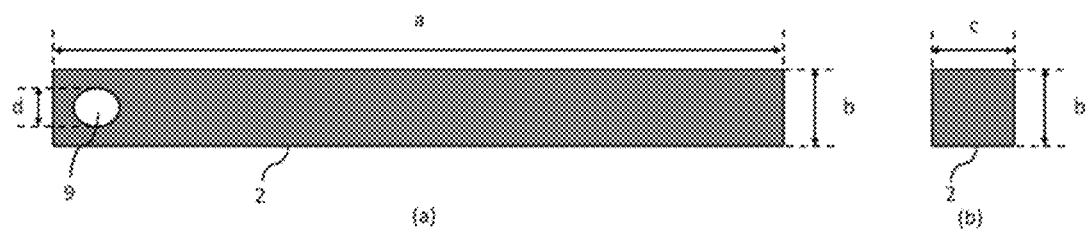
FIG. 5 is a schematic view of a rod-shaped carbon target, which is (a) a side view and (b) a front view.

The rod-shaped carbon target 2 fixed to the fixing jig 7 is irradiated with the laser light 5. The surface of the rod-shaped carbon target 2 is irradiated with a laser light 5, and a laser spot 9 is formed at that portion (irradiation position). In FIG. 5, the side surface of the rod-shaped carbon target 2 having the length a, the width b, and the depth c is irradiated with the laser light 5, and the laser spot 9 having the spot diameter d in the width direction of the rod-shaped carbon target 2 is formed on the side surface. The width b is set to be larger than the spot diameter d so that the laser spot 9 fits within the irradiation surface of the rod-shaped carbon target 2. In the present embodiment, it is preferable to irradiate the laser light 5 so that the center of the laser spot 9 (spot center) meets the central axis of the rod-shaped carbon target 2.

The rod-shaped carbon target 2 which is first irradiated with the In the present specification, the rod-shaped carbon target 2 that is first irradiated with laser is referred to as a first rod-shaped carbon target 2, and the rod-shaped carbon target 2 that is secondly irradiated with laser is referred to as a second rod-shaped carbon target 2.

For laser ablation, any $CO_2$ laser, excimer laser, YAG laser, semiconductor laser or the like that can heat the rod-shaped carbon target 2 to a high temperature can be used as appropriate, and a $CO_2$ laser that can easily achieve high output is most suitable. The power (output) of the $CO_2$ laser may be appropriately set, but a power of 1.0 kW to 10 kW is preferable, and a power of 2.0 kW to 5.0 kW is more preferable. If it is smaller than this power, carbon hardly evaporates, which is not preferable from the viewpoint of production amount. If it is more than this, impurities such as graphite and amorphous carbon increase, which is not preferable. Further, the irradiation of the laser light 5 can be performed by either continuous irradiation or pulse irradiation. Continuous irradiation is preferred for mass production.

As described above, the energy given from the laser light 5 causes the carbon in the laser spot 9 to evaporate and product CNB. However, the peripheral portion of the laser spot 9 is also thermally affected, and it is confirmed that the crystalline state of carbonaceous matter, the distribution of the catalyst metal, and the like are changed when analyzed after cooling. Such an area is called an altered area. Once in the altered region, no CNB is produced from that portion. Therefore, it is preferable that the production of the altered region is small. The size (length, width, depth) of the rod-shaped carbon target 2 is appropriately adjusted according to the size (spot diameter) of the laser spot 9 in order to reduce the altered region and effectively utilize the rod-shaped carbon target 2. When the rod-shaped carbon target 2 has a prismatic shape, the width and the depth are determined by the surface irradiated with the laser light 5. The width of the rod-shaped carbon target 2 is defined as the short side of the surface irradiated with the laser light 5. Further, the length in the direction perpendicular to the surface irradiated with the laser light 5 is defined as the depth. When the rod-shaped carbon target 2 has a cylindrical shape, the width and the depth are the diameter of the cylinder.

By making the width of the rod-shaped carbon target 2 close to the size of the spot diameter, the production of the altered region can be reduced. The spot diameter of the laser light 5, particularly the spot diameter in the width direction, is usually selected from the range where the irradiation area is about 0.02 $cm^2$ to about 2 $cm^2$, that is, the range of 0.5 mm to 5 mm. Here, the irradiation area can be controlled by the laser output and the degree of focusing by the lens. When simply described as "spot diameter", the "spot diameter" typically means the diameter of the laser spot 9 (circle) when the laser light 5 is applied to one point perpendicularly to the surface forming a plane. When the surface of the rod-shaped carbon target 2 is not flat or when the surface of the rod-shaped carbon target 2 is tilted, the shape of the laser spot 9 is not a circle but is, for example, a substantially ellipse, but a short length passing through the spot center of the laser light 5. The diameter is almost the same as the diameter of the circle. In the case of the spot diameter of the laser light 5 as described above, the width of the rod-shaped carbon target 2 is preferably set to a width of 1 mm to 20.5 mm. By setting the spot diameter of the laser light 5 and the width of the rod-shaped carbon target 2 in these ranges, most of the rod-shaped carbon target 2 can be utilized for the production of carbon nanohorn aggregates containing CNB. Further, the depth of the rod-shaped carbon target 2 can be set to an arbitrary value, but it is preferable that the depth is such that all the carbon of the laser spot evaporates with one irradiation of the laser light 5, for example, it is preferable to set the depth to 1 mm to 20 mm.

The length of the rod-shaped carbon target 2 may be appropriately adjusted depending on the manufacturing conditions and the like. Generally, when the rod-shaped carbon target 2 has a long length, a carbon nanohorn aggregate containing CNB can be continuously manufactured, and the manufacturing efficiency can be improved. In one embodiment, the length is preferably 50 mm or more, more preferably 60 mm or more. In one embodiment, the length can be 1000 mm or less.

Generally, in the rod-shaped carbon target 2, the ratio of the length to the width or the depth is preferably 2 or more, more preferably 3 or more, still more preferably 4 or more. Further, generally, the ratio of the length to the width or the depth is 100 or less.

When the rod-shaped carbon target 2 is irradiated with the laser light 5, the rod-shaped carbon target 2 is heated, a plume (light emission) is produced from the surface of the rod-shaped carbon target 2, and carbon is evaporated. At that time, when the laser light 5 forming an angle of 45 degrees with the surface of the rod-shaped carbon target 2 is irradiated, plumes are produced in a direction perpendicular to the surface of the rod-shaped carbon target 2. It is preferable to adjust the position of the rod-shaped carbon target 2 and the irradiation direction of the laser light 5 so that the laser light 5 does not hit the plume and pass through a portion other than the rod-shaped carbon target 2.

(Movement of Laser Light Irradiation Position)

The irradiation position of the laser light 5 on the rod-shaped carbon target 2 is moved in the longitudinal direction of the rod-shaped carbon target 2. The irradiation start position of the laser light 5 is not particularly limited, but one end is preferable, and if present, the end not fixed to the fixing jig 7 is more preferable. By moving the irradiation position of the laser light 5 from one end to the other end, a carbon nanohorn aggregate containing CNB can be produced from the entire surface of the rod-shaped carbon target 2. The method of moving the irradiation position of the laser light 5 is not particularly limited, but it is preferable to move the irradiation position of the laser light 5 by moving the rod-shaped carbon target 2 while fixing the irradiation direction of the laser light 5. In order to accurately move the irradiation position of the laser light 5 in the longitudinal direction, the fixing jig 7 may be provided with a moving means, and the fixing jig 7 may be provided with a connecting portion for attaching and detaching the moving means. By moving the rod-shaped carbon target 2 together with the fixing jig 7 by the moving means, the irradiation position of the laser light 5 can be moved. In FIG. 4, the moving direction of the rod-shaped carbon target 2 is indicated by an arrow. As a result, the irradiation position of the laser light 5 moves on the rod-shaped carbon target 2 from the end not fixed by the fixing jig 7 to the end fixed by the fixing jig 7. Further, when the irradiation position of the laser light 5 is moved out of the longitudinal direction, the rod-shaped carbon target 2 is not irradiated with the laser light 5 at an appropriate position, or the rod-shaped carbon target 2 itself is irradiated with the laser light 5. In particular, when the size of the rod-shaped carbon target 2 is adjusted so that the carbon target slightly remains outside the laser spot 9 in order to improve the manufacturing efficiency, such a problem is likely to occur. Therefore, in this embodiment, it is preferable to move the irradiation position of the laser light 5 only in the longitudinal direction of the rod-shaped carbon target 2. Therefore, the rod-shaped carbon target 2 is not rotated.

It is preferable to move the irradiation position of the laser light 5 at a constant speed so that the power density of the laser light 5 with which the surface of the rod-shaped carbon target 2 is irradiated becomes substantially constant. At this time, if the moving speed is too slow, carbon cannot be evaporated from the rod-shaped carbon target 2 and is deposited as a precipitate on the rod-shaped carbon target 2. This precipitate is mainly graphite or carbon nanotubes, and some CNHs are produced, but CNB is not produced. Although details are not clear, it is considered that slightly evaporated carbon is consumed for the production of CNHs and CNB is not produced. Further, even if the moving speed becomes too fast, it mainly becomes CNHs and CNB is not produced. Therefore, the moving speed is appropriately set according to the laser power, the spot diameter of the laser light 5, and the catalyst amount. For example, the moving speed can be set in the range of 0.05 cm/sec to 10 cm/sec.

(Switching of Rod-Shaped Carbon Targets)

When a plurality of rod-shaped carbon targets 2 are fixed to the fixing jig 7, the fixing jig 7 is rotated after the laser irradiation of the first rod-shaped carbon target 2 is completed, as a result, the irradiation position of the laser light 5 can be switched from the first rod-shaped carbon target 2 to the second rod-shaped carbon target 2. In FIG. 2 and FIG. 3, the direction in which the fixing jig 7 is rotated in order to switch the rod-shaped carbon target 2 is shown by an arrow. Of course, it may be rotated in the opposite direction of the arrow. Similar to the switching from the first rod-shaped carbon target 2 to the second rod-shaped carbon target 2, the other rod-shaped carbon targets 2 may be sequentially switched. Finally, a carbon nanohorn aggregate containing CNB can be obtained from all the rod-shaped carbon targets 2 fixed to the fixing jig 7. Thereby, it is possible to irradiate all the rod-shaped carbon targets 2 fixed to the fixing jig 7 with the laser light 5 without performing a complicated operation, and it is possible to improve the production rate of the carbon nanohorn aggregate including CNB.

Similar to the first rod-shaped carbon target 2, in the other rod-shaped carbon targets 2 as well, the irradiation start position of the laser beam 5 is preferably one of the ends, and if present, the end not fixed to the fixing jig 7 are more preferred. Before or after switching the rod-shaped carbon target 2, the fixing jig 7 may be moved to adjust the irradiation start position of the laser beam 5 of the rod-shaped carbon target 2 to be irradiated next.

(Additional Treatment)

The CNB obtained in this way can be further subjected to additional treatment such as hole opening treatment if necessary.

By the oxidation treatment, fine holes can be formed in the single-walled carbon nanohorn that constitutes CNB. By this oxidation treatment, surface functional groups containing oxygen are formed in the opening part. Further, as the oxidation treatment, a gas phase process and a liquid phase process can be used. In the case of a vapor phase process, heat treatment is performed in an atmospheric gas containing oxygen such as air, oxygen, carbon dioxide. Above all, air is suitable from the viewpoint of cost. The temperature is preferably in the range of 300 to 650° C., more preferably in the range of 400 to 550° C. At a temperature of 300° C. or more, there is no concern that the carbon will not burn and the holes cannot be opened. Further, it is possible to prevent the entire CNB from burning at 650° C. or less. In the case of the liquid phase process, it is performed in a liquid containing an oxidizing substance such as nitric acid, sulfuric acid, hydrogen peroxide. In the case of nitric acid, it can be used in the temperature range of room temperature to 120° C. If it is 120° C. or lower, it is not oxidized more than necessary. In the case of hydrogen peroxide, it can be used in the temperature range of room temperature to 100° C., more preferably 40° C. or higher. In the temperature range of 40 to 100° C., the oxidizing power acts efficiently and the pores can be formed efficiently. Further, it is more effective to use light irradiation in combination in the liquid phase process.

The catalytic metal contained in CNB can be removed if necessary. The catalytic metal dissolves in nitric acid, sulfuric acid and hydrochloric acid and can be removed. From the viewpoint of ease of use, hydrochloric acid is suitable. The temperature at which the catalyst is dissolved can be appropriately selected, but in the case of sufficiently removing the catalyst, it is desirable to perform heating at 70° C. or more. When nitric acid or sulfuric acid is used, the catalyst can be removed simultaneously with the formation of the openings or continuously. Further, since the catalyst may be covered with the carbon coating when CNB is produced, it is desirable to heat the catalyst at about 300 to 500° C.

The crystallinity of the obtained CNB can be improved by heat-treating it in a non-oxidizing atmosphere such as an inert gas, nitrogen, hydrogen, or vacuum. The heat treatment temperature may be 800 to 2000° C., preferably 1000 to 1500° C. Further, after the opening treatment, a surface functional group containing oxygen is formed in the opening portion, but it can be removed by heat treatment. The heat treatment temperature may be 150 to 2000° C. To remove surface functional groups such as carboxyl groups and hydroxyl groups, 150 to 600° C. is desirable. In order to remove the carbonyl group etc. which is a surface functional group, 600° C. or more is desirable. Further, the surface functional group can be removed by reducing under a gas or liquid atmosphere. Hydrogen can be used for the reduction in a gas atmosphere, and it can be combined with the above-mentioned improvement of crystallinity. In a liquid atmosphere, hydrazine or the like can be used.

The carbon nanohorn aggregate, which is a mixture of CNB and CNHs, can be used as it is or after CNB is isolated. It is preferably used as a mixture.

EXAMPLES

Hereinafter, the present invention will be described in more detail with reference to Examples. Of course, the present invention is not limited to the following examples.

Example 1

Nitrogen gas was flowed through the production chamber at 10 L/min, and the pressure was controlled to 700 to 950 Torr. The end of the rod-shaped carbon target of a square pillar (width: 17 mm, depth: 15 mm, length: 70 mm, bulk density: about 1.4 g/cm$^3$, thermal conductivity: about 5 W/(mK)) containing 1at. % of iron was installed at the rod-shaped carbon target insertion port of the fixing jig in the production chamber. While moving the rod-shaped carbon target along with the fixing jig in the longitudinal direction at a speed of 0.15 cm/sec, the target was continuously irradiated with $CO_2$ laser light for 30 sec. The laser power was 3.2 kW, the spot diameter was 1.5 mm, and the irradiation angle was adjusted to about 45 degrees at the spot center. The temperature in the production chamber was room temperature.

Figure 6:
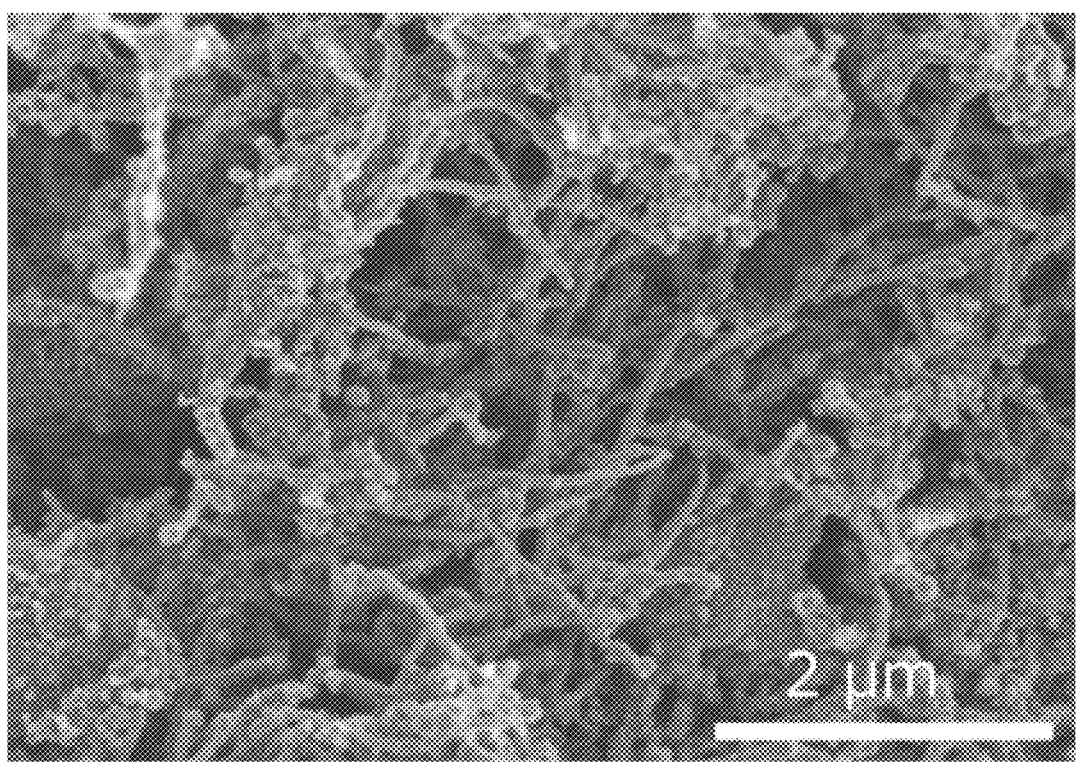
FIG. 6 is a SEM photograph of the product obtained in Example 1.
Figure 7:
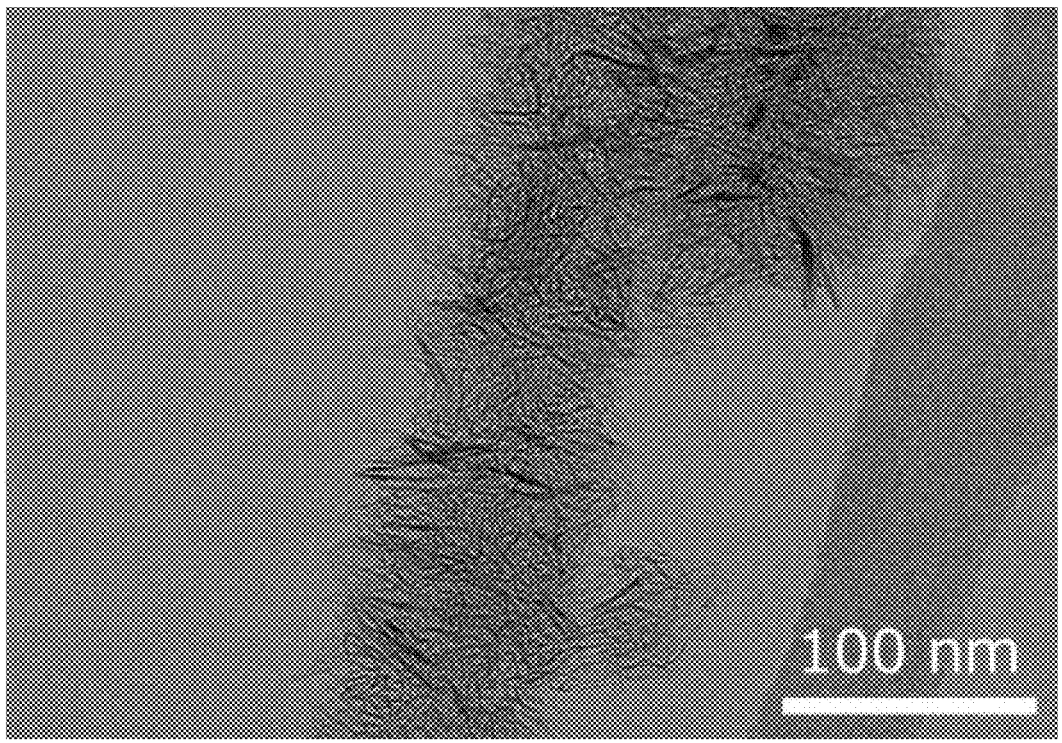
FIG. 7 is a TEM photograph of the product obtained in Example 1.

FIG. 6 is an SEM photograph of the obtained product. Fibrous structures and spherical structures were observed. It was found to contain a large number of fibrous structures. FIG. 7 is a TEM photograph of the obtained product. The fibrous and spherical structures were CNB and CNHs, respectively. In the CNB, single-wall carbon nanohorn having a diameter of 1 to 5 nm and a length of 40 to 50 nm were gathered in a fibrous shape. The CNB itself had a diameter of about 30 to 100 nm and a length of several μm to several tens of μm. The black linear structure found in CNB and CNHs is a structure in which a graphene sheet (petal) is viewed from the end. The black particles are catalytic metal (Fe).

Comparative Example 1

Figure 8:
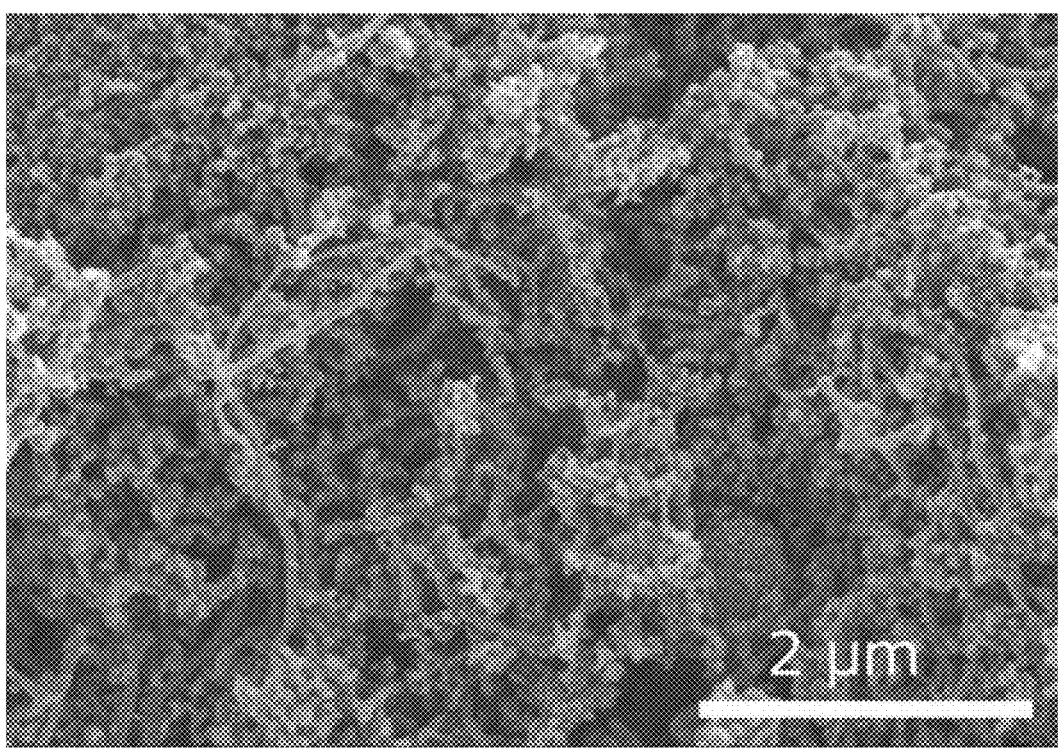
FIG. 8 is a SEM photograph of the product obtained in Comparative Example 1

Nitrogen gas was flowed through the production chamber at 10 L/min, and the pressure was controlled to 700 to 950 Torr. In this production chamber, a cylindrical carbon target (diameter: 30 mm, length: 50 mm, bulk density: about 1.4 g/cm$^3$, thermal conductivity: about 5 W/(mK)) containing 1 at. % of iron was continuously irradiated with $CO_2$ laser light 30 seconds while rotating at a speed of 1 rpm (linear velocity, 0.15 cm/sec). The laser power was 3.2 kW, the spot diameter was 1.5 mm, and the irradiation angle was adjusted to about 45 degrees at the spot center. The temperature in the production chamber was room temperature. FIG. 8 is an SEM photograph of the obtained product. Fibrous structures and spherical structures were observed. However, it was found that there were less fibrous structures compared to the product of Example 1.

Although the present invention has been described with reference to the exemplary embodiments and examples, the present invention is not limited to the above-described exemplary embodiments and examples. Various changes that can be understood by those skilled in the art can be made to the configuration and details of the present invention within the scope of the present invention.

DESCRIPTION OF THE SIGN 1 production chamber
2 rod-shaped carbon target
3 gas inlet port/exhaust port
4 laser irradiation window
5 laser light
6 product
7 fixing jig
8 rod-shaped carbon target insertion port
9 laser spot

The invention claimed is:

1. A method for producing a carbon nanohorn aggregate comprising a fibrous carbon nanohorn aggregate, the method comprising:
   a step (a) of fixing an end of a rod-shaped carbon target to a fixing jig, and
   a step (b) of irradiating the rod-shaped carbon target with a laser light, and moving a irradiation position of the laser light in a longitudinal direction of the rod-shaped carbon target without rotating the rod-shaped carbon target,
   wherein a spot diameter of the laser light is 0.5 mm to 5 mm, and a width of the rod-shaped carbon target is 1 mm to 20.5 mm.

2. A method for producing a carbon nanohorn aggregate according to claim 1, wherein the step (a) is a step of fixing ends of a plurality of rod-shaped carbon targets to the fixing jig, and
   the method further comprising a step (c) of rotating the fixing jig after the step (b), so as to switch the irradiation position of the laser light to another rod-shaped carbon target.

3. A method for producing a carbon nanohorn aggregate according to claim 1, wherein in the step (b), the irradiation position of the laser light is moved from an end portion not fixed by the fixed jig to an end portion fixed by the fixed jig.

4. A method for producing a carbon nanohorn aggregate according to claim 1, wherein the rod-shaped carbon target has a depth of 1 mm to 20 mm.

5. A member for manufacturing a carbon nanohorn aggregate comprising a fibrous carbon nanohorn aggregate, the member comprising:

a plurality of rod-shaped carbon targets and a fixing jig for fixing the plurality of rod-shaped carbon targets at an end of the fixing jig, wherein the rod-shaped carbon target has a width of 1 mm to 20.5 mm.

6. The manufacturing member according to claim 5, wherein the rod-shaped carbon target has a depth of 1 mm to 20 mm.

* * * * *